United States Patent Office 3,677,941
Patented July 18, 1972

3,677,941
OIL FRACTURING PROPPING AGENTS
Vincent B. Mazzara, Galveston, and Jerome M. Fesperman, Texas City, Tex., assignors to Standard Oil Company, Chicago, Ill.
No Drawing. Continuation of abandoned application Ser. No. 778,012, Nov. 19, 1968, which is a continuation of application Ser. No. 337,719, Jan. 15, 1964. This application Oct. 29, 1969, Ser. No. 872,426
Int. Cl. C21b 43/25
U.S. Cl. 252—8.55 R                    5 Claims

ABSTRACT OF THE DISCLOSURE

Substantially spherical oil-soluble propping particles for use in fracturing underground oil or gas formations comprise polymerized alicyclic olefinic hydrocarbons containing anti-oxidants which inhibit the formation of oil-insoluble residue in such particles.

---

This application is a continuation of our prior application Ser. No. 778,012 filed Nov. 19, 1968, now abandoned, which was itself a continuation of our prior application Ser. No. 337,719 filed Jan. 15, 1964, now abandoned.

This invention relates to the manufacture of oil-soluble prilled resins characterized by the freedom from an oil-insoluble resinous residue, and to the use of such resins in the fracturing of crude oil formations.

It has been discovered by others several years ago that substantially spherical deformable propping agents would be useful in an improvement on the Hydrofrac Process for increasing the productivity of underground oil or gas formations. The Hydrofrac Process is described in Farris' U.S. Reissue Patent No. 23,733. In the improved process, substantially spherical deformable particles, such as black walnut shells, hickory nut shells, peach pits, nylon beads or aluminum alloy beads are used as the propping agent. By using a deformable propping agent, the reduction in the porosity of the fractured formation resulting from the shattering of hard brittle particles, such as sand, is avoided. Usually, sufficient propping agents are used to provide a mono-layer of them in the fractured formation. Upon reimposition of the overburden load following the fracturing of the underground formation, the deformable propping agents tend to be squeezed together, and, if used in a mono-layer, thereby restrict the rate at which oil or gas may be produced. The use of deformable propping agents is described in a paper by Messrs. C. R. Fast, Don H. Flickinger, and George C. Howard, titled "Effect of Fracture-Formation Flow Capacity Contrast on Well Productivity," originally presented before the April 1961, meeting of the Mid-Continent district of the Division of Production, Amercian Petroleum Institute, printed at p. 141 in the 1961 edition of Drilling and Production Practice. The disclosures of this paper and of all other publications and patents cited herein are expressly incorporated by reference into this specification.

In order to provide channels through the deformed propping agents through which oil may flow, spacer particles of an oil-soluble material are included with the deformable propping agents used to fracture the formation. The oil-soluble particles are preferably of about the same size as the deformable agents, of about the same density, and have a melting point greater than the temperature of the formation being fractured. The bulk volume of the oil-soluble particles to the deformable propping agents generally will be in the range of about 2:1 to 20:1, frequently in the range of 3:1 to 10:1. The oil-soluble spacer particles are uniformly mixed in a suitable liquid carrier, usually water, with the propping agents and pumped into the formation to be fractured. In the fracture, the spacer particles and the propping agents are particles substantially uniformly distributed.

The use of oil-soluble spacer particles in the Hydrofrac Process is further described at p. 33 of the Sept. 30, 1963, issue of The Oil and Gas Journal.

It is most important that the oil-soluble spacer be substantially entirely soluble in the crude oil being produced from the fractured formation. The solubility characteristic is required because any oil-insoluble residue from the spacer particles would tend to result in restricting the flow of crude oil in a manner which would be most difficult to correct, and, in aggravated instances, might result in completely plugging the oil formation.

In addition to having the oil-soluble spacer substantially the same size as the deformable propping agent, it is highly desirable that such material be substantially spherical; the use of a spacer material which is not spherical, even though it may be of the same mesh size as the propping agents, is not satisfactory because the irregular shape of crushed or granular spacer material results in bridging within the fractured formation, thereby preventing even distribution of the propping agent and oil-soluble spacing material, and also restricting the flow of gas or crude oil.

We have now discovered that a substantially spherical and substantially completely oil-soluble spacing material may be manufactured by prilling a synthetic resin derived by polymerizing a predominantly olefinic normally liquid feedstock and by incorporating into the molten resin prior to prilling a small amount of an anti-oxidant. The amount of the anti-oxidant used is that which is sufficient, generally less than 5 weight percent based on the molten resin, to prevent the formation of an oil-insoluble skin on the resin spheres during the prilling step and in subsequent storage.

We have also discovered that the agglomeration of resinous spacer particles (irrespective of the method of their manufacture) in a water slurry of propping agents and such particles may be avoided by adding to the water a minor amount of a surfactant.

The synthetic resin referred to herein may be made by catalytic polymerization with a Friedel-Crafts type catalyst, such as borontrifluoride, as described in F. T. Wadsworth's U.S. Pat. No. 2,709,696, or aluminum trichloride as disclosed in J. A. Ridgway's U.S. Pat. No. 2,823,198, or by thermal polymerization, as described in Wadsworth and Kenton's U.S. Pat. No. 3,040,009. Thermal polymerizations are conducted at temperatures in the range of about 350°–600° F., more generally in the range of 400 to 500° F., and at elevated pressures, sufficient at least to maintain the feedstock and reaction mixture in the liquid phase. Residence times in thermal polymerizations range from about 4 hours to about 2 days, with the shorter residence times being used with higher reaction temperatures. Catalytic polymerizations are conducted at somewhat lower temperatures, and for shorter reaction times than are thermal polymerizations, with temperatures in the range of about —120° F. to 400° F. being suitable, and with reaction times from a few hours down to a few minutes.

The selection of the desired feedstock from which to make the resin depends upon the type of polymerization reaction being used. When a thermal polymerization reaction is used, a predominant part of the reactive constituents in the feedstock are preferably alicyclic polyolefins, advantageously the dicyclopentadienes. The term "reactive constituents" means those compounds in the feedstock which enter into the polymerization reaction. Aryl olefins may be included in the feedstock used for thermal polymerization, but should comprise less than 50% of the reactive ingredients. Such aryl olefins are, illustratively, styrene and vinyl toluene. Indene is an aryl alicyclic olefin and is a more suitable constituent than aryl olefins, but less desirable than dicyclopentadiene. Suitable resins may also be made by thermally polymerizing indene and coumarone. When a catalytic polymerization reaction is used, the predominant portion of the feedstock may be mono- or polyolefinic alicyclic compounds, and mixtures thereof. The limitations referred to above on the content of aryl olefins in a feedstock to a thermal polymerization process apply as well to a catalytic polymerization process.

Charge stocks suitable for making the resin used in the invention include a highly olefinic heavy naphtha fraction of the type produced by high temperature pyrolysis of petroleum fractions, advantageously normally gaseous compounds such as ethane, propane, and the butanes, but also including the products from the pyrolysis of naphthas and gas oils. A heavy naphtha fraction recovered as a by-product from the dehydrogenation of ethyl benzene to make styrene may also be used as a feedstock. Although the highly olefinic heavy naphtha feedstocks comprise predominantly olefinic compounds, they usually also comprise aryl olefinic compounds, and frequently comprise substantial portions of aromatic or naphthalenic compounds having no olefinic groups. Because the latter types of compounds do not contain any olefinic bonds, they do not enter into the polymerization reaction and are not reactive constituents.

An illustrative feedstock appropriate for thermal polymerization is one comprising about 40 weight percent dicyclopentadiene, about 20% styrene, about 1 to 3% mono- and dimethylated derivatives of dicyclopentadiene, and the remainder a mixture of benzene, toluene, and xylene. An illustrative feedstock suitable for catalytic polymerization using boron trifluoride comprises 15 to 20% dicyclopentadiene, about 20% vinyl toluene, about 20% indene (each of the foregoing amounts includes methylated derivatives of the designated compounds), and the remaining approximately 40% xylenes and trimethyl benzenes.

The resin produced in the polymerization step is next stripped of non-polymerized material and low molecular weight polymerization products until the desired softening point (as measured by ASTM Test D-36) has been achieved. Normally, a softening point in the range of 200 to 300° F. is suitable, preferably at least 230° F. The stripping is conducted at elevated temperatures, suitably at or slightly below the polymerization reaction temperature, and at substantially atmospheric pressure. Any inert gas may be used for the stripping operation, including steam, nitrogen, flue gas, or light hydrocarbons such as ethane or propane. The stripping may be done in the reaction vessel.

Following the stripping operation, a minor amount of an anti-oxidant is incorporated into the molten resin. Sufficient anti-oxidant is used to prevent the formation in the resin of an oil-insoluble residue. Such a residue forms in many synthetic resins during the prilling step as a thin layer (or "skin") on the surface of the resin spheres. The amount of anti-oxidant used to accomplish the objective varies somewhat depending upon the character of the feedstock, the severity of conditions used in prilling, and the specific anti-oxidant selected. The optimum amount of anti-oxidant to be added to the resin may readily be determined, inasmuch as it varies over a narrow range, from about 0.01 to about 2 weight percent, based on the resin, illustratively from about 0.1 to 1.0%. Somewhat greater amounts of anti-oxidant may be used, but gross amounts of anti-oxidant are undesirable, and tend to promote oxidation.

In a continuous process, the molten resin following the stripping step is sent to the prilling tower, generally passing through a surge drum en route. The anti-oxidant may be added to the molten resin as it flows through a pipe, and is advantageously added to the resin in the surge drum with appropriate mixing facilities. In the event that the resin is allowed to solidify after the stripping step and prior to prilling, and is thereafter melted for prilling, the anti-oxidant may be added after the resin has been re-melted, or more preferably, prior to its solidification.

Suitable anti-oxidants for use in the process include the dihydroxy benzenes, the hydroxy anilines, and the phenylene diamines, wherein the hydroxy and/or amino groups are in the ortho- or para-position in respect of one another around the benzene ring. The aromatic nucleus may optionally be substituted with short-chain alkyl radicals having up to about 8 carbon atoms per radical. Other suitable anti-oxidants are dithiodialiphatic acids and their derivatives, such as dithiodipropionic acid, and its distearyl esterification derivative. Suitable anti-oxidants are N-butyl para-amino phenol, N,N'-diisopropyl paraphenylene diamine, and distearyl thiodipropionate. A preferred anti-oxidant is 2,6-ditertiarybutyl para-cresol.

It is also desirable that the anti-oxidant also have anti-polymerization characteristics to the resin, and thus arrest or retard the increase in the softening point of the resin. (This phenomenon is often termed "softening point creep.") The alkyl-substituted dihydroxy benzenes have superior anti-polymerization characteristics.

In accelerated aging tests, in which the resin sample was maintained in open dishes in a forced draft oven controlled at 125° F., 2,6-ditertiarybutyl para-cresol prevented the formation of detectable insolubles for several days, depending on the amount of such cresol which was incorporated into the resin. Illustrative aging test data are:

| Amount of para-cresol, weight percent— | Aging period prior to formation of insolubles, days |
| --- | --- |
| 0 | 1.8 |
| 0.1 | 4.9 |
| 0.3 | 11.2 |
| 0.5 | 15.8 |
| 1.0 | 17.8 |

Under normal storage conditions, the oil-insoluble fraction of a sample of resin containing 0.1 weight percent of 2,6-ditertiarybutyl paracresol increased from undetectable to 3.5% in a period of two months. The oil-insoluble fraction referred to herein is determined gravimetrically, based on the insoluble portion remaining when 1 gram of resin is dissolved at 68–77° F. over a twenty minute period in 100 ml. of stirred kerosene.

The anti-polymerization characteristics of 2,6-ditertiarybutyl para-cresol were demonstrated in an accelerated test in which the resin samples are held at 400° F. for 24 hours. The softening point of a non-inhibited resin increased from 208° F. to 295° F. during such a test, whereas 100 p.p.m. by weight of 2,6-ditertiarybutyl para-cresol restricted the softening point increase of a different aliquot of such resin to only 228° F., and 100 p.p.m. of distearyl thiodipropionate restricted the increase to 259° F.

The resin having an anti-oxidant incorporated therein is formed into small solid spheres in a prilling tower wherein the molten resin is forced under pressure through small orifices. The resin forms small droplets upon being jetted from the orifices. These droplets solidify during their fall through the tower into spheres, and are collected at the bottom of the tower. A fluidized bed of resin spheres is advantageously maintained at the bottom of the prilling tower. The gas, normally air, in the bottom portion of the tower is relatively cool, generally maintained at ambient or room temperature and flows upwardly with a low linear velocity. The gas immediately below the orifices is warmed, preferably to a temperature somewhat greater than the temperature of the molten resin, and is either quiescent or flows downwardly at a very slow velocity.

The size of the product resin spheres may be conveniently controlled by adjusting the surface tension of the resin. The surface tension is related to viscosity and, for the sake of convenience, viscosity measurements are used in the control. A suitable resin viscosity is in the range of from about 1000 to 6000 centipoises at 330° F., preferably in the range of 1500 to 3000 centipoises. The size of the spheres may be increased by increasing the viscosity of the resin as it is jetted through the orifice; this may be done by increasing the softening point of the resin, as by stripping at a higher temperature or more exhaustive stripping, or it may be done by reducing the temperature of the molten resin at which it is jetted through the orifices. Resin temperatures of about 300 to 500° F. are normally suitable, with temperatures in the range of about 300–380° F. being used for resins derived by thermally polymerizing a dicyclopentadiene-rich feedstock.

Reducing the orifice diameter tends to reduce the size of the product spheres, but the sphere size is not as sensitive to orifice diameter as it is to changes in resin viscosity. An orifice diameter in the range of 0.020 to 0.060 inches is suitable for making spheres which are predominantly in the 4 to 20 mesh size range. (As used herein, mesh size refers to U.S. standard sieve screens of the same numerical designation.) Reducing the size of the orifice requires increased pressure on the molten resin and also increases the likelihood of the orifices becoming plugged.

Information relating to the design and operation of prilling towers, and the closely related drop-shotting towers, has been widely published; see, for instance, Yeandle's U.S. Pat. No. 2,528,407, Bettes' U.S. Pat. No. 2,887,724, Deniston's U.S. Pat. No. 496,044, and Bower et al.'s U.S. Pat. No. 2,921,335.

A specific embodiment of our invention is described hereinafter. A highly olefinic heavy naphtha fraction derived from the high temperature pyrolysis of a stream comprising predominantly ethane and propane was thermally polymerized. The heavy naphtha contained 20% dicyclopentadiene, 40% styrene, about 3% of miscellaneous olefinic aliphatic compounds, including methylated dicyclopentadiene and indene, and the remainder alkylated aromatics having 7 to 10 carbon atoms per molecule. The cracked naphtha had an API gravity of 20° and the following distillation (ASTM D–86) characteristics:

|      | ° F. |
|------|------|
| IBP  | 230  |
| 5%   | 266  |
| 10%  | 273  |
| 50%  | 323  |
| 95%  | 392  |
| FBP  | 420  |

The heavy naphtha was polymerized in three batches by subjecting it to a temperature of 460° F. and a pressure of 260 p.s.i.g. for 16 hours, during which the dicyclopentadienes and the styrene polymerized. Thereafter, the pressure was released, the polymerization reaction mixture allowed to cool slightly and was then steam stripped at atmospheric pressure to a softening point of 235° F. (as measured by ASTM D–36).

After stripping, the resin was cooled to about 350° F., and 0.1% based on the melted resin, of 2,6-ditertiarybutyl para-cresol was added to the melt with sufficient stirring to assure uniform dispersion. The resin was then prilled to form small spheres passing through an 8 mesh screen, but retained upon a 20 mesh screen. The prilling tower had a free fall of 43.5 feet (10 feet of which was maintained at about 470° F.) into a thin fluidized bed of resin spheres. At the spray header of the tower the resin was maintained at 305–330° F. and under a pressure of 8 to 12.5 p.s.i.g. The prilled resin had a density of 1.1 gram/ml.

The spray header had about 5300 holes with 0.040 inch diameters. Samples of the product resin were tested and found to have a softening point of 237° F. A one gram sample readily dissolved in 100 ml. of kerosene at 77° F. without leaving any detectable insoluble fraction. The prilling tower product had the following screen size distribution: on 8, 10%; 8–10, 6%; 10–12, 24%; 12–14, 31%; 14–16, 20%; 16–20, 7%; and through 20, 2%. Such product was then sized using a Rotex two-deck screen to yield a fraction having 97.4% in the 12–20 mesh range. This fraction was used in the field tests described in the next paragraph.

The resin so produced was used in fracturing a newly completed oil well in the McLish sand formation in Oklahoma at a depth of 7,750 feet. The fracturing was done by first injecting 20–40 mesh sand into the formation followed by a water slurry containing three pounds of 12–20 mesh resin spheres as spacers per pound of 12–20 mesh substantially spherical black walnut shells. Initial production from this well was 2.5 times greater than initial production from conventionally fractured wells located nearby in the same sand formation. There has been no indication in this well, or in similarly treated subsequently completed wells, of any reduction in flow caused by insoluble resin particles.

Tests on similar batches of resin containing in the range of 0.1 to 1.0% of 2,6-ditertiarybutyl para-cresol show that the solubility of such resin is not less than 10 weight percent at 80° F. in paraffinic, naphthenic and asphaltic crudes.

In treating oil formations with aqueous slurries of a deformable propping agent and spherical resin spacers, there was initially some agglomeration of the resin spheres. This was undesirable because it altered the ratio between the propping agent and the resin spheres in the slurry, and increased the risk of fracture of the resin spheres as a result of mechanical stresses during the pumping of the slurry from the earth's surface into the fractured formation. We have discovered that the agglomeration may be avoided by adding to the slurry water a minor amount, in the range of about 0.01 to about 1.0 volume percent based on the water in the slurry, of a surfactant. The surfactant may be added to the water containing the resin spacers, but is more preferably added prior to adding the resin spacers. Preferred surfactants are of the anionic class, such as those derived from sulfurates, but cationic and non-ionic surfactants may also be used.

We claim:

1. Substantially spherical deformable crude oil-soluble resin propping particles having a mesh size in the 4 to 20 mesh range, a viscosity within the range of 1,000 to 6,000 centipoises at 330° F. and a softening point within the range of 200° F. to 300° F., said resin being selected from the group of (1) a resin comprising a polymerized alicyclic olefinic hydrocarbon selected from the group of dicyclopentadiene, indene, and mixtures thereof and (2) a resin comprising a copolymer obtained from the polymerization of a mixture containing (a) a predominant amount of an alicyclic olefinic hydrocarbon selected from the group of dicyclopentadiene, indene, and mixtures thereof with (b) an aryl olefinic compound selected from the group of styrene and vinyl toluene, said resin having incorporated therein an anti-oxidant effective to substantially reduce the formation of a crude oil insoluble residue in said particles in an amount of about 0.01 to about 3 weight percent based on the weight of said particles, said anti-oxidant selected from the group of dithiodipropionic acid, distearyl thiodipropionate, N-butyl para-amino phenol, N,N′-diisopropyl paraphenylene diamine, and 2,6-ditertiarybutyl paracresol.

2. The propping particles of claim 1 wherein said antioxidant is N-butyl para-amino phenol.

3. The propping particles of claim 1 wherein said antioxidant is N,N'-diisopropyl paraphenylene diamine.

4. The propping particles of claim 1 wherein said antioxidant is distearyl thiodipropionate.

5. The propping particles of claim 1 wherein said antioxidant is 2,6-ditertiarybutyl paracresol.

References Cited

UNITED STATES PATENTS

| | | | |
|---|---|---|---|
| 2,462,684 | 2/1949 | Soday | 260—45.95 |
| 2,470,447 | 5/1949 | Van Gilder | 260—45.95 |
| 2,835,650 | 5/1958 | Nelson et al. | 260—45.95 |
| 3,321,428 | 5/1967 | Tordella | 260—45.95 |
| 3,325,464 | 6/1967 | Weil | 260—45.95 |
| 3,463,134 | 9/1968 | Wilson et al. | 260—45.95 |
| 3,400,099 | 9/1968 | Cook | 260—45.85 |
| 3,025,571 | 3/1962 | Beecher et al. | 264—13 |
| 3,058,159 | 10/1962 | Ishizuka | 264—13 |
| 2,950,247 | 8/1960 | McGuire et al. | 252—8.55 |
| 3,159,673 | 9/1964 | Pennington | 252—8.55 |
| 3,217,801 | 11/1965 | Fast et al. | 252—8.55 |

DONALD E. CZAJA, Primary Examiner

V. P. HOKE, Assistant Examiner

U.S. Cl. X.R.

166—280; 260—45.85 S, 45.9 R, 45.95